United States Patent
Parks

(10) Patent No.: US 9,167,182 B2
(45) Date of Patent: Oct. 20, 2015

(54) CHARGE SENSING IN IMAGE SENSORS WITH OUTPUT CHANNEL HAVING MULTIPLE-GAIN OUTPUT PATHS

(71) Applicant: Semiconductor Components Industries, LLC, Phoenix, AZ (US)

(72) Inventor: Christopher Parks, Rochester, NY (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 346 days.

(21) Appl. No.: 13/625,069

(22) Filed: Sep. 24, 2012

(65) Prior Publication Data

US 2013/0099095 A1   Apr. 25, 2013

Related U.S. Application Data

(60) Provisional application No. 61/539,092, filed on Sep. 26, 2011.

(51) Int. Cl.
*H04N 5/355* (2011.01)
*H04N 5/3745* (2011.01)

(52) U.S. Cl.
CPC ......... *H04N 5/3559* (2013.01); *H04N 5/37452* (2013.01)

(58) Field of Classification Search
USPC .......... 257/431; 348/297, 281, 300, 301, 311, 348/282, 283; 250/208.1, 214.1, 214 R, 250/214 DC, 214 A
See application file for complete search history.

(56) References Cited

U.S. PATENT DOCUMENTS

| | | |
|---|---|---|
| 4,719,512 A | 1/1988 | Endo et al. |
| 4,797,571 A | 1/1989 | Ozawa |
| 4,807,037 A | 2/1989 | Iesaka et al. |
| 5,060,070 A | 10/1991 | Nishida et al. |
| 5,162,913 A | 11/1992 | Chatenever et al. |
| 5,248,871 A | 9/1993 | Takenaka |
| 5,500,383 A | 3/1996 | Hynecek |
| 5,578,842 A | 11/1996 | Shinji |
| 5,610,654 A | 3/1997 | Parulski et al. |
| 5,872,484 A | 2/1999 | Hynecek |
| 5,892,540 A | 4/1999 | Kozlowski et al. |
| 5,905,256 A | 5/1999 | Nakano |
| 5,965,871 A | 10/1999 | Zhou et al. |
| 6,157,259 A | 12/2000 | Dasgupta |
| 6,441,684 B1 | 8/2002 | Nakamura |
| 6,445,022 B1 | 9/2002 | Barna et al. |
| 6,459,078 B1 | 10/2002 | Fowler |
| 6,674,094 B2 | 1/2004 | Sekine |
| 6,757,018 B1 | 6/2004 | Fowler |
| 6,777,660 B1 | 8/2004 | Lee |
| 6,787,751 B2 | 9/2004 | Tanimoto |

(Continued)

FOREIGN PATENT DOCUMENTS

| | | |
|---|---|---|
| EP | 0878958 B1 | 3/2003 |
| JP | 57142080 A | 9/1982 |

(Continued)

OTHER PUBLICATIONS

European Search Report for Application No. EP 12186086 dated Aug. 30, 2013, 2 pages.

*Primary Examiner* — Francis M Legasse, Jr.

(57) ABSTRACT

In various embodiments, image sensors include output channels enabling high-gain and/or low-gain charge read-out while minimizing charge-conversion noise.

18 Claims, 12 Drawing Sheets

(56) References Cited

U.S. PATENT DOCUMENTS

| | | |
|---|---|---|
| 6,903,670 B1 | 6/2005 | Lee et al. |
| 7,012,635 B2 | 3/2006 | Umeda et al. |
| 7,133,074 B1 | 11/2006 | Brehmer et al. |
| 7,145,122 B2 | 12/2006 | Nozaki et al. |
| 7,236,117 B1 | 6/2007 | Varma et al. |
| 7,268,338 B2 | 9/2007 | Liu et al. |
| 7,432,962 B2 | 10/2008 | Oda et al. |
| 7,443,435 B2 | 10/2008 | Loose |
| 7,468,500 B2 | 12/2008 | Hynecek |
| 7,518,645 B2 | 4/2009 | Farrier |
| 2001/0055067 A1 | 12/2001 | Wada |
| 2002/0176009 A1 | 11/2002 | Johnson et al. |
| 2005/0088549 A1 | 4/2005 | Hatano et al. |
| 2006/0181627 A1* | 8/2006 | Farrier ............ 348/308 |
| 2008/0309809 A1 | 12/2008 | Cieslinski |
| 2009/0032852 A1 | 2/2009 | Song et al. |
| 2009/0225208 A1 | 9/2009 | Yoshizawa et al. |
| 2010/0140452 A1 | 6/2010 | Vampola et al. |
| 2010/0225795 A1* | 9/2010 | Suzuki et al. ............ 348/300 |
| 2010/0265371 A1 | 10/2010 | Vogel et al. |
| 2012/0028400 A1 | 2/2012 | Wang |

FOREIGN PATENT DOCUMENTS

| | | |
|---|---|---|
| JP | 3157051 A | 7/1991 |
| JP | 2007088620 A | 4/2007 |

* cited by examiner

CHARGE SENSING IN IMAGE SENSORS WITH OUTPUT CHANNEL HAVING MULTIPLE-GAIN OUTPUT PATHS

RELATED APPLICATION

This application claims the benefit of and priority to U.S. Provisional Patent Application No. 61/539,092, filed Sep. 26, 2011, the entire disclosure of which is hereby incorporated herein by reference.

TECHNICAL FIELD

The present invention relates, in various embodiments, to charge sensing in image sensors, and in particular to charge sensing with multiple different gains.

BACKGROUND

CCD image sensors typically include an array of photosensitive areas (or "pixels") that collect charge carriers in response to illumination. The collected charge is subsequently transferred from the array of pixels and converted to a voltage from which an image may be reconstructed by associated circuitry. FIG. 1A depicts a conventional interline CCD image sensor 10 that contains an array of photodiodes 11 arranged in columns. A vertical CCD (VCCD) 12 is disposed next to each column of photodiodes 11, and the VCCDs 12 are connected to a horizontal CCD (HCCD) 13. Each photodiode 11 along with its corresponding portion of VCCD 12 constitutes a pixel of the image sensor 10. Following an exposure period, charge is transferred from the photodiodes 11 into the VCCDs 12, which subsequently shift the charge, row-by-row in parallel, into the HCCD. The HCCD then transfers the charge serially to output circuitry 14 that includes, e.g., a floating diffusion sense node and an output buffer amplifier. The charge from the HCCD is converted, pixel-by-pixel, into voltage at the output circuitry 14, and the signal is then transferred to additional circuitry (either on-chip or off-chip) for reconstruction into an image.

FIG. 1B illustrates a portion of a conventional output channel for sampling a charge packet with two different gains. The output channel includes a CCD shift register (e.g., an HCCD) and CCD gates 140 and 145. FIG. 1B depicts the CCD shift register as a pseudo-two-phase CCD shift register, but the CCD shift register may be implemented as, e.g., a two-phase, three-phase, or four-phase CCD shift register, details of which are known in the art and therefore not described in detail. The charge packets are transferred from right to left (in the direction of arrow 150) through the CCD shift register by the complementary clocking of CCD gates 140, 145. Each charge packet transfers through an output gate 135 to a sense node 125 at the end of the CCD shift register. The sense node 125 is connected to the gate of a transistor (or an "amplification circuit") 130. Sense node 125 and amplification circuit 130 are implemented, e.g., as a floating diffusion and source follower transistor, respectively.

Current sink 131 is the load for the source node of transistor 130. The drain node of transistor 130 is connected to power supply 133. Output signal line 132 is an output of the amplification circuit 130. Reset transistors 110, 120 control the capacitance of the sense node 125. The two reset transistors allow for two different charge-to-voltage conversion gains (high and low) of the amplification circuit 130.

The charge-sampling technique for high gain holds the reset transistor 110 continuously in the on state. To sample one charge packet, the reset transistor 120 is pulsed on and then off to reset the voltage of the sense node 125. The voltage of the sense node 125 is equal to the voltage of diffusion region 105. A reset level ($V_{RH}$) is sampled on the output signal line 132 of the amplification circuit 130. Next, a charge packet is transferred from the CCD shift register, through the output gate 135, to the sense node 125. A signal level ($V_{SH}$) is then sampled on the output signal line 132. The magnitude of the charge packet is represented by the difference between the signal level sampled at high gain and the reset level sampled at high gain ($V_{SH}-V_{RH}$).

The charge-sampling technique for low gain holds the reset transistor 120 continuously in the on state. When reset transistor 120 is on, the sense node 125 expands to include both diffusion region 115 and sense node 125. This adds capacitance to the amplification circuit 130. The additional capacitance reduces the voltage change caused by transferring a charge packet onto the sense node 125. To sample one charge packet, the reset transistor 110 is pulsed on and then off to reset the voltage of the combined sense node 125 and diffusion region 115. The voltage of the combined sense node 125 and diffusion region 115 is equal to the voltage of the diffusion region 105. A reset level ($V_{RL}$) is sampled on the output signal line 132 of the amplification circuit 130. Next, a charge packet is transferred from the CCD shift register, through the output gate 135, to the combined sense node 125 and diffusion region 115. A signal level ($V_{SL}$) is then sampled on the output signal line 132. The magnitude of the charge packet is represented by the different between the signal level sampled at low gain and the reset level sampled at low gain ($V_{SL}-V_{RL}$).

The capacitance added by diffusion region 115 may be just the diffusion region capacitance itself, or it may include additional capacitance from a capacitor formed by a gate or plates of metal. Such conventional techniques for sampling a charge packet with high or low gain may involve a noise penalty. The amplification circuit 130 has its own gate dimensions, width W and length L, which are typically optimized for lowest noise performance in the high-gain mode. As known to those of skill in the art, the width and length of the gate of the amplification circuit 130 as well as the thickness of the gate oxide have an impact on the noise of the transistor. When the capacitance of diffusion region 115 is added to the capacitance of the sense node 125, charge-to-voltage noise will result unless the transistor 130 gate width, length, and gate oxide thickness are optimized for the additional capacitance—which, typically, they are not. Thus, there is a need for image sensor designs enabling charge sampling at different gains without concomitant conversion-noise penalties.

SUMMARY

Embodiments of the present invention enable charge-to-voltage conversion and read-out from photosensitive image sensors at low gain levels and/or high gain levels. In various embodiments of the invention, a plurality of dedicated amplification and read-out circuits are utilized for charge sampling at different gain levels (i.e., each at a different gain level), and various characteristics of the circuit (e.g., transistor gate length, gate width, and gate oxide thickness) may be optimized for the capacitance level of the sense node(s) utilized for read-out at the specific gain level. Thus, charge-conversion noise may be minimized or substantially eliminated in both low-gain and high-gain read-out modes, improving performance of the image sensor.

In an aspect, embodiments of the invention feature an image sensor including or consisting essentially of an array of photo-sensitive regions (PSRs) for accumulating photo-charge in response to incident light and an output channel associated with at least one of the PSRs. The output channel includes or consists essentially of (i) a sense node for converting photocharge into voltage, (ii) a capacitance control unit connected to the sense node, (iii) connected to the sense node, a first amplification circuit having a first transconductance, and (iv) connected to the capacitance control unit, a second amplification circuit having a second transconductance larger than the first transconductance.

Embodiments of the invention may incorporate one or more of the following in any of a variety of combinations. The capacitance control unit may include or consist essentially of two reset transistors and a second sense node connected therebetween. The second amplification circuit may be connected to the second sense node. The first amplification circuit may include or consist essentially of a first transistor having a first gate length, a first gate width, and a first gate oxide thickness. The second amplification circuit may include or consist essentially of a second transistor having a second gate length, a second gate width, and a second gate oxide thickness. The first and second gate oxide thicknesses may be different. The ratio of the first gate width to the first gate length may be selected based on the capacitance of the sense node. The ratio of the second gate width to the second gate length may be selected based on the combined capacitance of the sense node and the second sense node. The ratio of the first gate width to the first gate length may be smaller than a ratio of the second gate width to the second gate length. Each PSR is a portion of a CCD image sensor pixel, and the output channel may be associated with a plurality of columns of CCD image sensor pixels. Each PSR may be a portion of a CMOS image sensor pixel, and a different output channel may be associated with each CMOS image sensor pixel.

In another aspect, embodiments of the invention feature an image sensor that includes an array of photo-sensitive regions (PSRs) for accumulating photocharge in response to incident light. Associated with at least one of the PSRs are (i) a first sense node for converting photocharge into voltage, (ii) a first capacitance control unit connected to the first sense node, and (iii) connected to the first sense node, a first amplification circuit having a first transconductance. Associated with at least one other of the PSRs are (i) a second sense node for converting photocharge into voltage, (ii) a second capacitance control unit connected to the second sense node, and (iii) connected to the second sense node, a second amplification circuit having a second transconductance. A third amplification circuit having a third transconductance larger than at least one of the first or second transconductances is connected to the first and second capacitance control units.

Embodiments of the invention may incorporate one or more of the following in any of a variety of combinations. The first and second transconductances may be approximately equal. The third transconductance may be larger than both the first and second transconductances. The first amplification circuit may include or consist essentially of a first transistor having a first gate length, a first gate width, and a first gate oxide thickness. The second amplification circuit may include or consist essentially of a second transistor having a second gate length, a second gate width, and a second gate oxide thickness. The third amplification circuit may include or consist essentially of a third transistor having a third gate length, a third gate width, and a third gate oxide thickness. The first gate length may be approximately equal to the second gate length. The first gate width may be approximately equal to the second gate width. The first gate oxide thickness may be approximately equal to the second gate oxide thickness. The ratio of the first gate width to the first gate length may be smaller than the ratio of the third gate width to the third gate length.

In yet another aspect, embodiments of the invention feature an image sensor including or consisting essentially of a first pixel, a second pixel, and a third amplification circuit. The first pixel includes or consists essentially of (i) a first photosensitive region for accumulating photocharge in response to incident light, (ii) a first sense node for converting photocharge into voltage, (iii) a first capacitance control unit connected to the first sense node, and (iv) connected to the first sense node, a first amplification circuit having a first transconductance. The second pixel includes or consists essentially of (i) a second photosensitive region for accumulating photocharge in response to incident light, (ii) a second sense node for converting photocharge into voltage, (iii) a second capacitance control unit connected to the second sense node, and (iv) connected to the second sense node, a second amplification circuit having a second transconductance. The third amplification circuit is connected to the first and second capacitance control units and has a third transconductance larger than at least one of the first or second transconductances.

In a further aspect, embodiments of the invention feature a method of measuring accumulated charge at low gain and high gain in an image sensor having an array of photo-sensitive regions (PSRs) and, associated with at least one PSR, an output channel including or consisting essentially of (i) a sense node, (ii) a first amplification circuit having a first transconductance, and (iii) a second amplification circuit having a second transconductance larger than the first transconductance. Charge is accumulated within at least one PSR in response to incident light. Before the accumulated charge is transferred to the sense node, (i) a high-gain reset level is sampled with the first amplification circuit and (ii) a low-gain reset level is sampled with the second amplification circuit. The accumulated charge is transferred to the sense node to convert the charge into a voltage. After the accumulated charge is transferred to the sense node, (i) a high-gain signal level corresponding to the accumulated charge is sampled with the first amplification circuit and (ii) a low-gain signal level corresponding to the accumulated charge is sampled with the second amplification circuit. The low-gain measure of the accumulated charge is the difference between the low-gain signal level and the low-gain reset level, and the high-gain measure of the accumulated charge is the difference between the high-gain signal level and the high-gain reset level.

In yet a further aspect, embodiments of the invention feature a method of measuring accumulated charge at least at one of low gain or high gain in an image sensor comprising an array of photo-sensitive regions (PSRs) for accumulating photocharge in response to incident light and associated with at least one of the PSRs, an output channel comprising (i) a sense node for converting photocharge into voltage, (ii) a capacitance control unit connected to the sense node, (iii) connected to the sense node, a first amplification circuit having a first transconductance, and (iv) connected to the capacitance control unit, a second amplification circuit having a second transconductance larger than the first transconductance. A high-gain reset level and a high-gain signal level are sampled and/or a low-gain reset level and a low-gain signal level are sampled. The high-gain reset level may be sampled with the first amplification circuit before transferring accumulated charge to the sense node, and the high-gain signal level may be sampled with the first amplification circuit after transferring accumulated charge to the sense node, the high-gain measure of the accumulated charge being the difference between the high-gain signal level and the high-gain reset level. The low-gain reset level may be sampled with the second amplification circuit before transferring accumulated charge to the sense node, and the low-gain signal level may be sampled with the second amplification circuit after transferring accumulated charge to the sense node, the low-gain measure of the accumulated charge being the difference between the low-gain signal level and the low-gain reset level.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean ±10%, and in some embodiments, ±5%. The term "consists essentially of" means excluding other materials that contribute to function, unless otherwise defined herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 2:
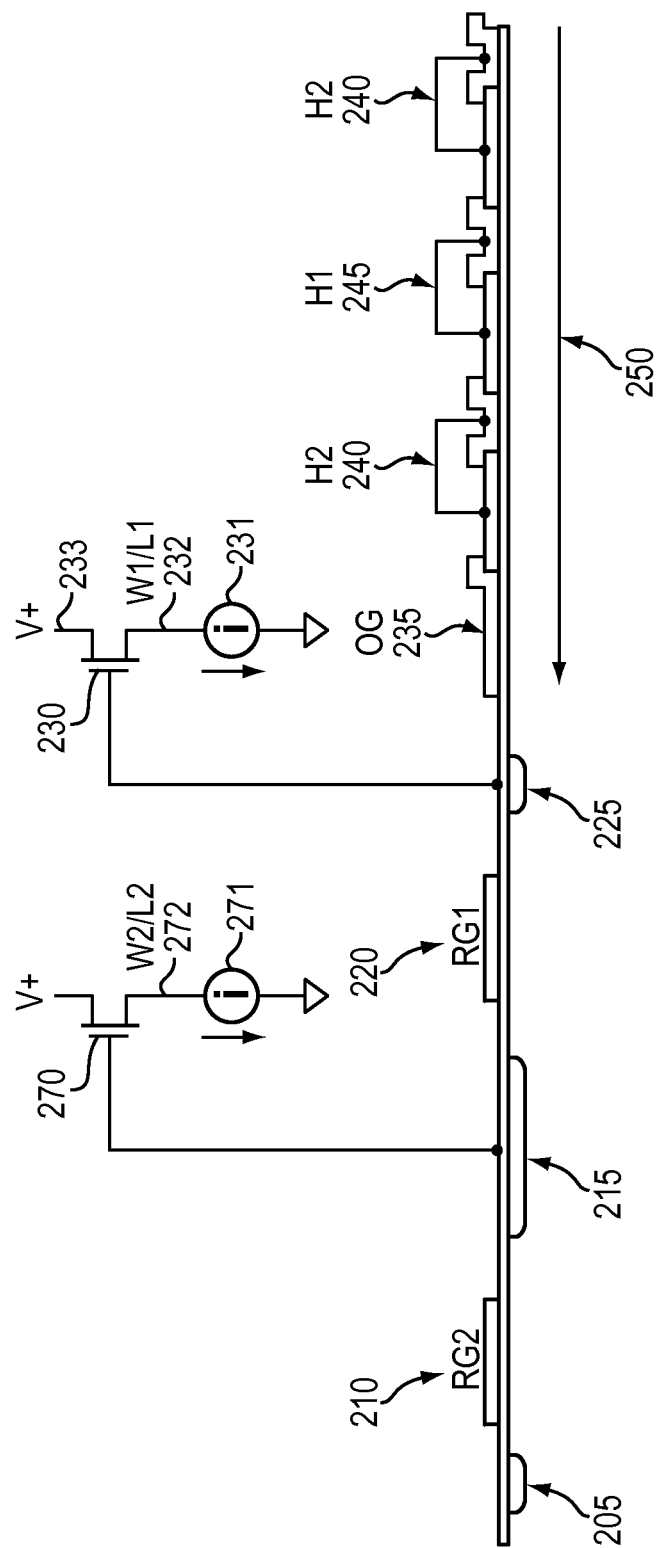
FIG. 2 is a schematic diagram of an output channel for a CCD image sensor in accordance with various embodiments of the invention.

FIG. 2 depicts a portion of an output channel in a first embodiment in accordance with the invention. The output channel includes a CCD shift register and CCD gates 240 and 245. FIG. 2 depicts the CCD shift register as a pseudo-two-phase CCD shift register. Other embodiments in accordance with the invention may implement the CCD shift register differently, such as, for example, a two-phase, three-phase, or four-phase CCD shift register. Charge packets are transferred from right to left (in the direction of arrow 250) through the CCD shift register by the complementary clocking of CCD gates 240 and 245. At the end of the CCD shift register, a charge packet transfers through an output gate 235 to a first sense node 225. The first sense node 225 is connected to the gate of an amplification circuit (e.g., a transistor) 230. A current sink 231 is the load for the source node of transistor 230 and the drain node of transistor 230 is connected to a power supply 233. An output signal line 232 is an output of the amplification circuit 230.

Figure 1A:
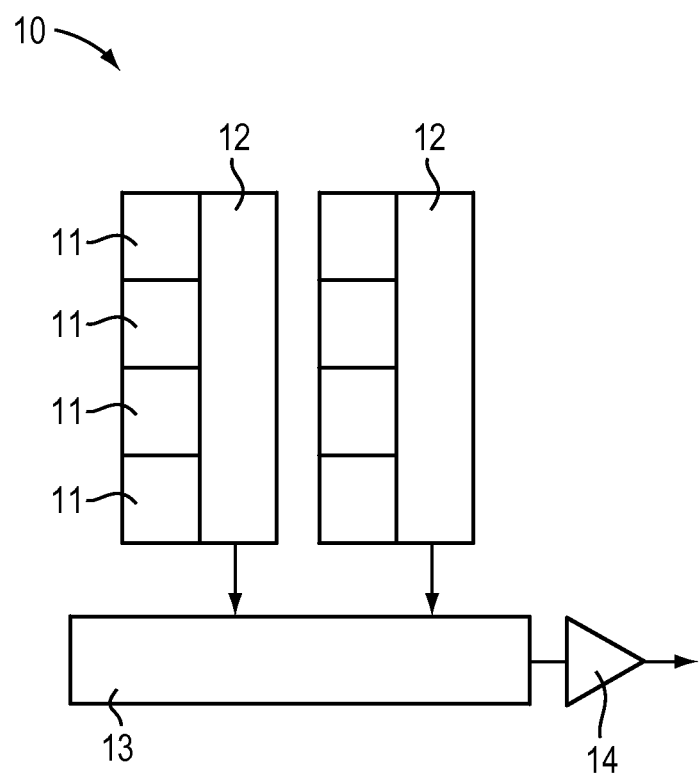
FIG. 1A is a block diagram of a conventional CCD image sensor.
Figure 1B:
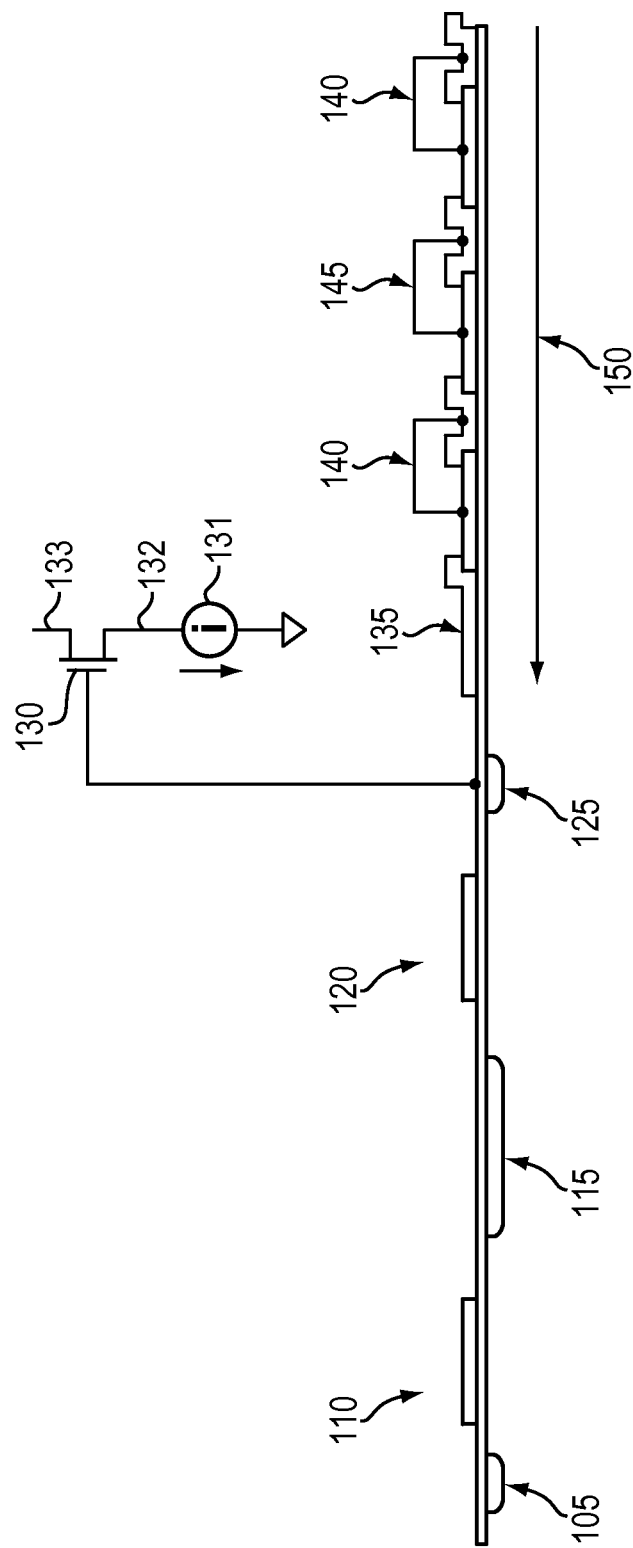
FIG. 1B is a schematic diagram of a conventional image-sensor output channel.

The output channel is typically connected to (and reads out the charge from) an imaging array of photo-sensitive regions (PSRs), as shown in FIG. 1A, where each PSR includes or consists essentially of a region (typically a semiconductor region) that produces charge (i.e., "photocharge") when exposed to light. Exemplary PSRs include photodiodes, photodetectors, photoconductors, and/or photocapacitors (and the terms PSR and photodiode are utilized interchangeably herein).

Two reset transistors 210, 220 control the capacitance of the first sense node 225. The two reset transistors 210, 220 allow for two different charge-to-voltage conversion gains (high and low) of the amplification circuit 230. Reset transistor 220 individually, or in combination with reset transistor 210, operates as a capacitance control unit.

When the reset transistor 220 is held continuously in an on state, first sense node 225 is combined with a second sense node 215 to produce a low-gain high capacitance. An output signal line 272 of a second amplification circuit (e.g., a transistor) 270 is then sampled. A current sink 271 is the load for the source node of transistor 270. The width-to-length ratio W2/L2 of the second amplification circuit 270 is optimized for the higher capacitance of the combined first and second sense nodes 215, 225 when sampling charge packets at low gain. The width-to-length ratio W1/L1 of the first amplification circuit 230 is optimized for the lower capacitance of the first sense node 225 alone (i.e., without second sense node 215) when sampling charge packets at low gain. The optimization of the width-to-length ratios, as well as the thicknesses of the gate oxides of the two amplification circuits 230, 270 are designed to minimize noise in an embodiment in accordance with the invention.

The selection of particular gate width, gate length, and gate oxide thickness values results in particular transconductance values for the amplification circuits. As known in the art, the transconductance of a transistor is typically defined as the change in source-to-drain current divided by the change in gate-to-source voltage. A larger transconductance generally provides a lower-noise transistor (and hence, in the present embodiments, a lower-noise amplification circuit). The transconductance may be increased by decreasing the gate length of the transistor, increasing the gate width of the transistor, or increasing the width-to-length ratio. A thinner gate oxide will also increase the transconductance. The first amplification circuit 230 preferably has a smaller transconductance than that of the second amplification circuit 270 because a small capacitance is desired for high gain. Increased transconductance generally adds more capacitance to the transistor gate, which in preferred embodiments is not desired for the high-gain sense node, but is desired for the low-gain sense node.

The output signal line 272 of second amplification circuit 270 is sampled for low gain and the output signal line 232 of first amplification circuit 230 is sampled for high gain. The gain ratio of the two amplification circuits 230, 270 may be determined by sampling the output signal lines 232, 272 simultaneously while in low-gain readout mode.

Figure 3:
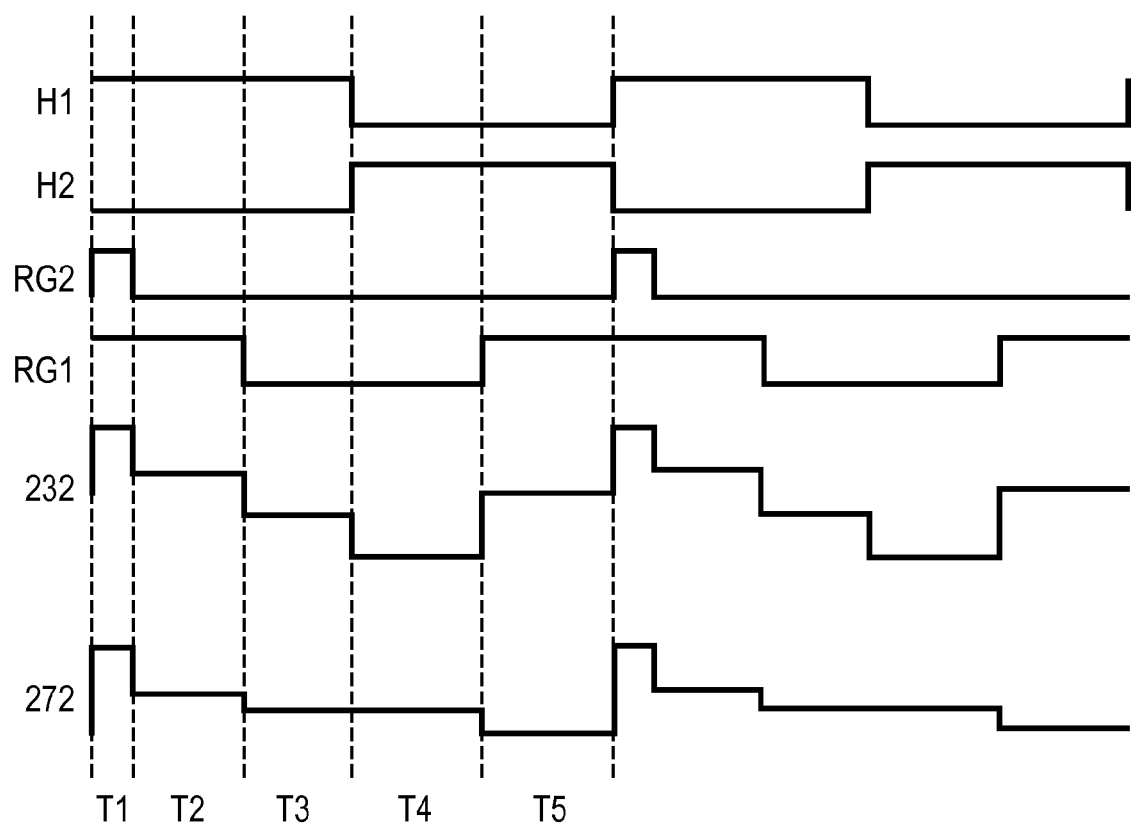
FIGS. 3, 4A, and 4B are timing diagrams for the operation of the output channel of FIG. 2 in accordance with various embodiments of the invention.

FIG. 3 illustrates a timing diagram suitable to read out a charge packet at both high and low gain in an embodiment in accordance with the invention. At time T1, the gate RG1 of the first reset transistor 220 is on and the gate RG2 of the second reset transistor 210 is pulsed on to reset the first and second sense nodes 215, 225 to the voltage of the reset drain diffusion region 205. At time T2, a reset level ($V_{RH}$) on the output signal line 232 of the low-gain reset transistor 270 is sampled. At time T3, the gate RG1 of the first reset transistor 220 is switched off and a reset level ($V_{RL}$) on the output signal line 230 of the high-gain amplification circuit 230 is sampled. At time T4, the CCD gates 240 and 245 are clocked to transfer one charge packet onto the first sense node 225 and a signal level ($V_{SH}$) on the output signal line 232 of the high-gain amplifier 230 is sampled. The difference between the signal and reset levels ($V_{SH}$-$V_{RH}$) of the high-gain amplification circuit 230 is a high-gain measure of the charge packet.

At time T5, the gate RG1 of the first reset transistor 220 is turned on and a signal level ($V_{SL}$) of the low-gain amplification circuit 270 is sampled. The difference between the signal and reset levels ($V_{SL}$-$V_{RL}$) of the low-gain amplification circuit 270 is a low-gain measure of the charge packet.

Figure 4A:
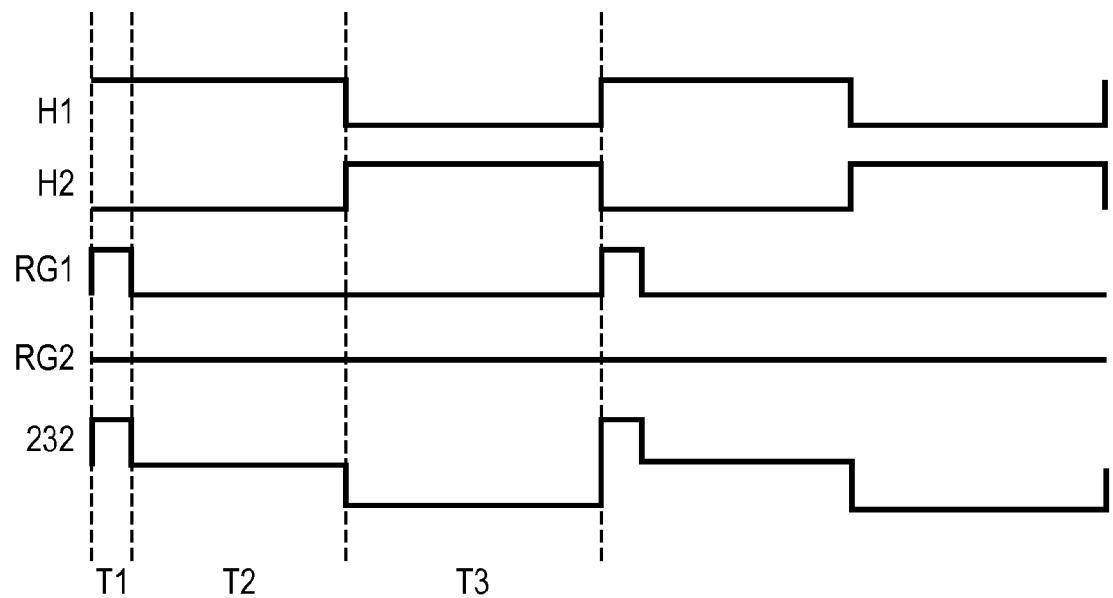

FIG. 4A illustrates a timing diagram suitable to read out a charge packet at high gain in an embodiment in accordance with the invention. The gate RG2 of the second reset transistor 210 is held on for the entire time one charge packet is read out. At time T1, the gate RG1 of the first reset transistor 220 is pulsed on to reset the first sense node 225 to the voltage of the reset drain diffusion region 205. At time T2, a reset level ($V_{RH}$) on the output signal line 232 of the high-gain amplification circuit 230 is sampled. At time T3, the CCD gates 240 and 245 are clocked to transfer one charge packet onto the first sense node 225 and a signal level ($V_{SH}$) on the output signal line 232 of the high-gain amplification circuit 230 is sampled. The difference between the signal and reset levels ($V_{SH}$-$V_{RH}$) of the high-gain amplifier 230 is a high-gain measure of the charge packet.

Figure 4B:
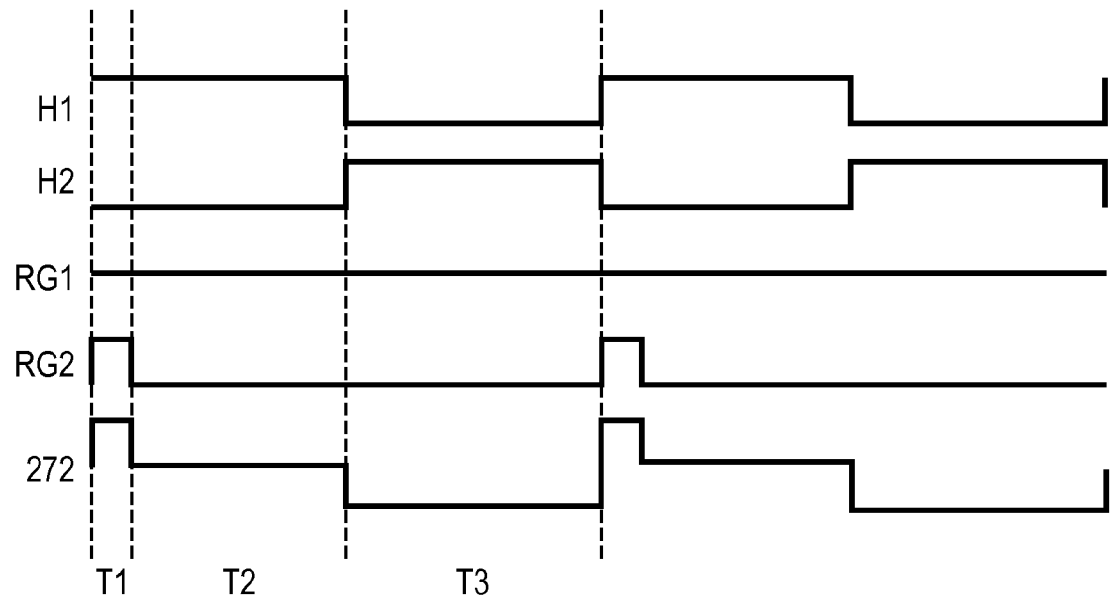

FIG. 4B depicts a timing diagram suitable to read out a charge packet at low gain in an embodiment in accordance with the invention. The gate RG1 of the first reset transistor 220 is held on for the entire time one charge packet is read out. At time T1, the gate RG2 of the second reset transistor 210 is pulsed on to reset the combined first sense node 225 and second sense node 215 to the voltage level on the reset drain diffusion region 205. At time T2, a reset level ($V_{RL}$) on the output signal line 272 of the low gain amplification circuit 270 is sampled. At time T3, the CCD gates 240 and 245 are clocked to transfer one charge packet onto the combined first sense node 225 and second sense node 215 and a signal level ($V_{SL}$) on the output signal line 272 of the low-gain amplification circuit 270 is sampled. The difference between the signal and reset levels ($V_{SL}$-$V_{RL}$) of the low-gain amplification circuit 270 is a low-gain measure of the charge packet.

Figure 5:
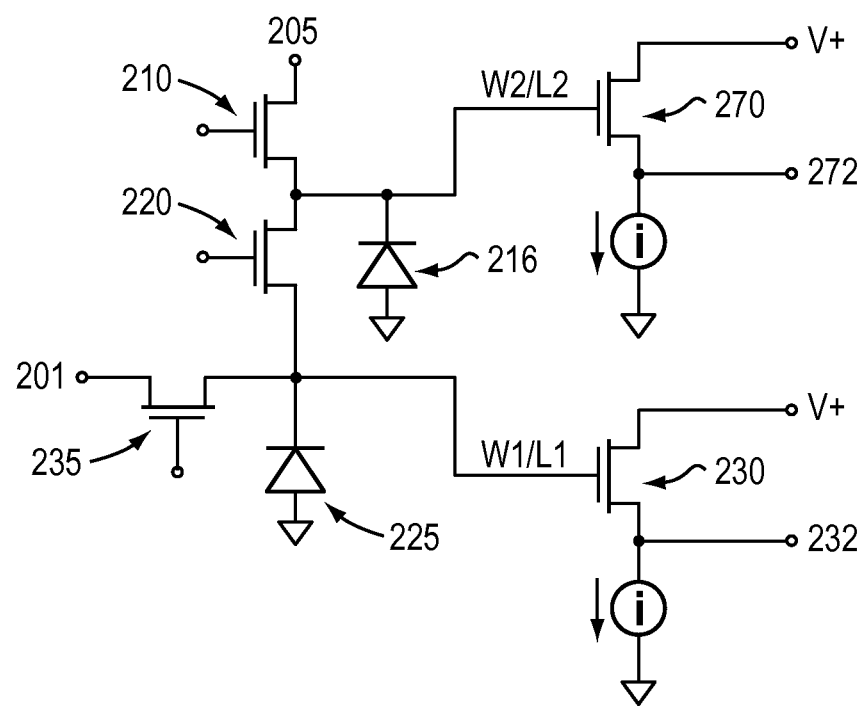
FIG. 5 is a circuit diagram of the output channel of FIG. 2.

FIG. 5 is a schematic diagram of the embodiment shown in FIG. 2. The width-to-length ratios of the two amplification circuits 230 and 270 are preferably designed to satisfy the relationship:

$$\frac{W1}{L1} < \frac{W2}{L2}.$$

The larger W2/L2 ratio adds capacitance to the second sense node 215 to reduce the gain. The larger W2/L2 ratio also reduces the noise of the amplification circuit 270. In some embodiments, if only the capacitance of the second sense node 215 is increased without changing the dimensions of the amplification circuit 270, the noise of the low gain output may be very high. The gate oxide thickness of the amplification circuit 230 may be made different from the gate oxide thickness of the amplification circuit 270 for further optimization of the noise performance in one or more embodiments in accordance with the invention. One advantage of the first embodiment of the invention is the noise of the low-gain amplification circuit 270 is typically reduced without causing substantial harm to the noise performance of the high-gain amplification circuit 230.

Figure 6:
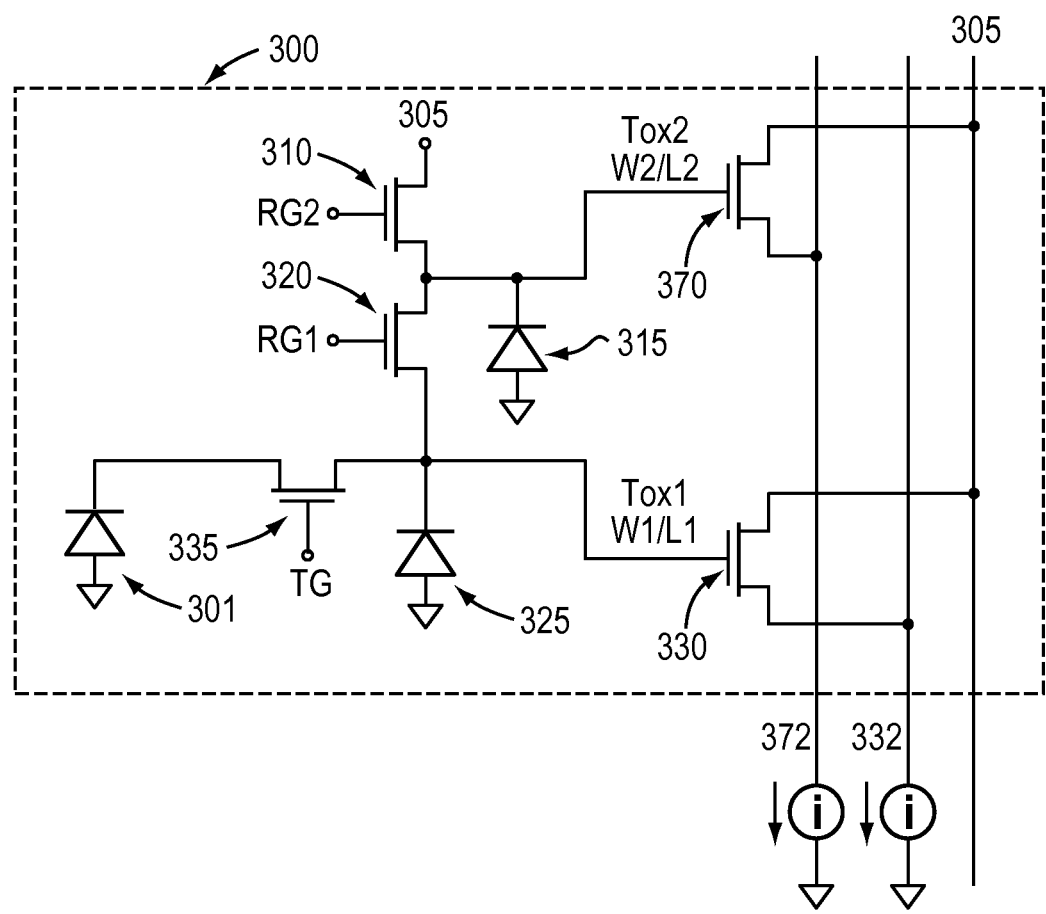
FIG. 6 is a schematic diagram of an output channel for a CMOS image sensor in accordance with various embodiments of the invention.

FIG. 6 illustrates a second embodiment of the present invention. The second embodiment is implemented in Complementary Metal Oxide Semiconductor (CMOS) image sensors. In the FIG. 6 embodiment, the output transistor 235 shown in FIG. 5 is replaced with a transfer gate 335, and CCD node 201 in FIG. 5 is replaced with a photodetector (i.e., a PSR) 301. A pixel 300 includes photodetector 301, transfer gate 335, and a sense node 325. Photodetector 301 collects charge carriers in response to incident light. Transfer gate 335 is used to transfer the charge carriers from photodetector 301 to sense node 325. In some embodiments in accordance with the invention, pixel 300 is implemented in a shared-pixel configuration where multiple photodetectors share a transfer gate. The shared transfer gate connects each photodetector to a single sense node 325. Image sensors in accordance with embodiments of the invention feature arrays of pixels 300, typically arranged in rectilinear arrays of rows and columns.

Sense node 325 is connected to the gate of a first amplification circuit 330 having a gate width W1, gate length L1, and oxide thickness Tox1. The output of the first amplification circuit 330 is connected to an output signal column line 332. A row-select transistor (not shown) may be inserted between the output of amplification circuit 330 and the output signal column line 332.

A first reset transistor 320 is connected to the first sense node 325 and a second sense node 315. A second reset transistor 310 is connected to the second sense node 315 and a power supply 305. The second sense node 315 is also connected to a second amplification circuit 370 having a gate width W2, gate length L2, and oxide thickness Tox2. The output of the second amplification circuit 370 is connected to an output signal column line 372. Reset transistor 320 individually, or in combination with reset transistor 310, operates as a capacitance control unit.

In the embodiment of FIG. 6, the first amplification circuit 330 is the high-gain amplifier because it has a small input capacitance of the first sense node 325 alone. The second amplification circuit 370 is the low-gain amplifier because it has a larger input capacitance corresponding to the first sense node 325 and the second sense node 315.

Figure 7:
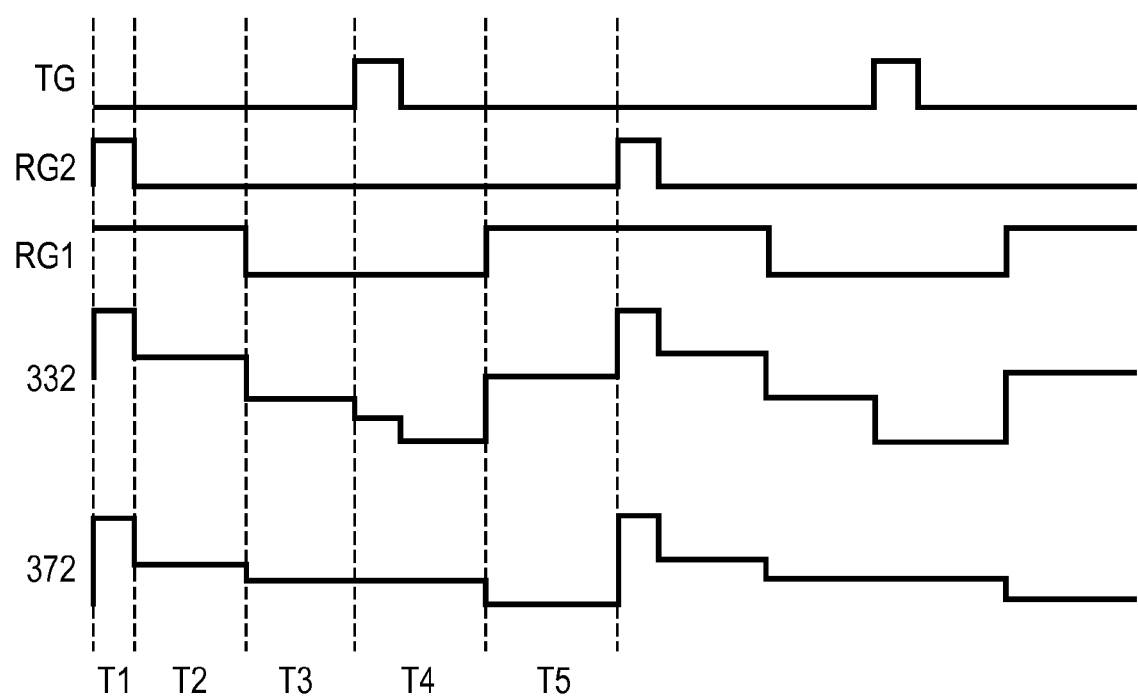
FIGS. 7, 8A, and 8B are timing diagrams for the operation of the output channel of FIG. 6 in accordance with various embodiments of the invention.

FIG. 7 shows a timing diagram suitable to read out a charge packet at both high and low gain in an embodiment in accordance with the invention. At time T1, a gate RG1 of the first reset transistor 320 is on and a gate RG2 of the second reset transistor 310 is pulsed on to reset the first and second sense nodes 315, 325 to the voltage of the power supply 305. At time T2, a reset level ($V_{RH}$) of the low-gain amplification circuit 370 on output signal column line 372 is sampled. At time T3, the gate RG1 of the first reset transistor 320 is switched off and a reset level ($V_{RL}$) of the high-gain amplification circuit 330 on output signal column line 332 is sampled. At time T4, the transfer gate 335 is clocked to transfer one charge packet from photodetector 301 onto the first sense node 325 and a signal level ($V_{SH}$) of the high-gain amplification circuit 330 on output signal column line 332 is sampled. The difference between the signal and reset levels ($V_{SH}$-$V_{RH}$) of the high-gain amplification circuit 330 is a high-gain measure of the charge packet.

At time T5, the gate RG1 of the first reset transistor 320 is turned on and a signal level ($V_{SL}$) of the low-gain amplification circuit 370 on output signal column line 372 is sampled. The difference between the signal and reset levels ($V_{SL}$-$V_{RL}$) of the low-gain amplifier 370 is a low-gain measure of the charge packet.

Figure 8A:
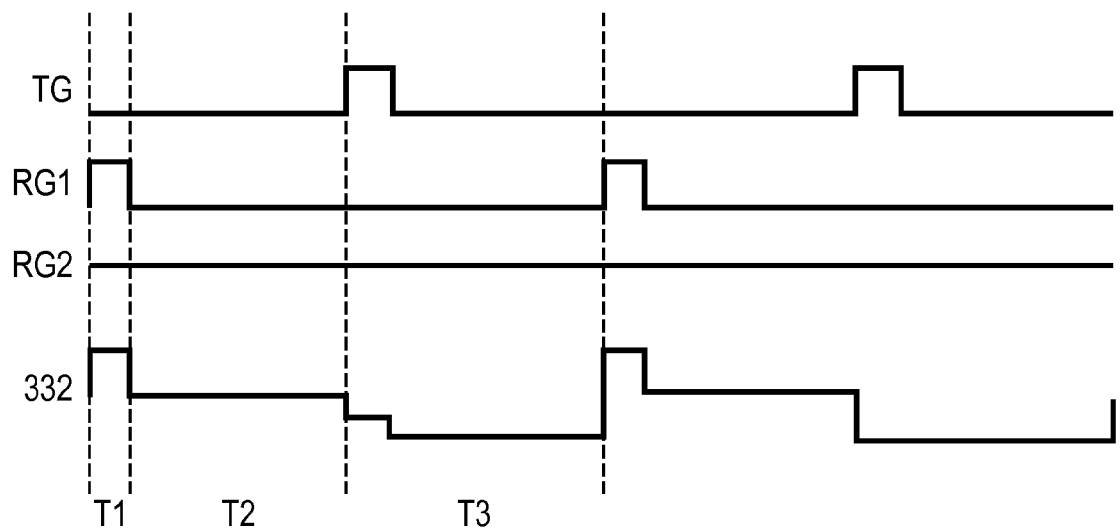

FIG. 8A illustrates a timing diagram suitable to read out a charge packet at high gain in an embodiment in accordance with the invention. The gate RG2 of the second reset transistor 310 is held on for the entire time one charge packet is read out. At time T1, the gate RG1 of the first reset transistor 320 is pulsed on to reset the first sense node 325 to the power supply voltage 305. At time T2, a reset level ($V_{RH}$) of the high-gain amplification circuit 330 on the output signal column line 332 is sampled. At time T3, the transfer gate 335 is clocked to transfer one charge packet from the photodetector 301 onto the first sense node 325 and a signal level ($V_{SH}$) of the high-gain amplification circuit 330 on output signal column line 332 is sampled. The difference between the signal and reset levels ($V_{SH}$-$V_{RH}$) of the high-gain amplification circuit 330 is a high-gain measure of the charge packet.

Figure 8B:
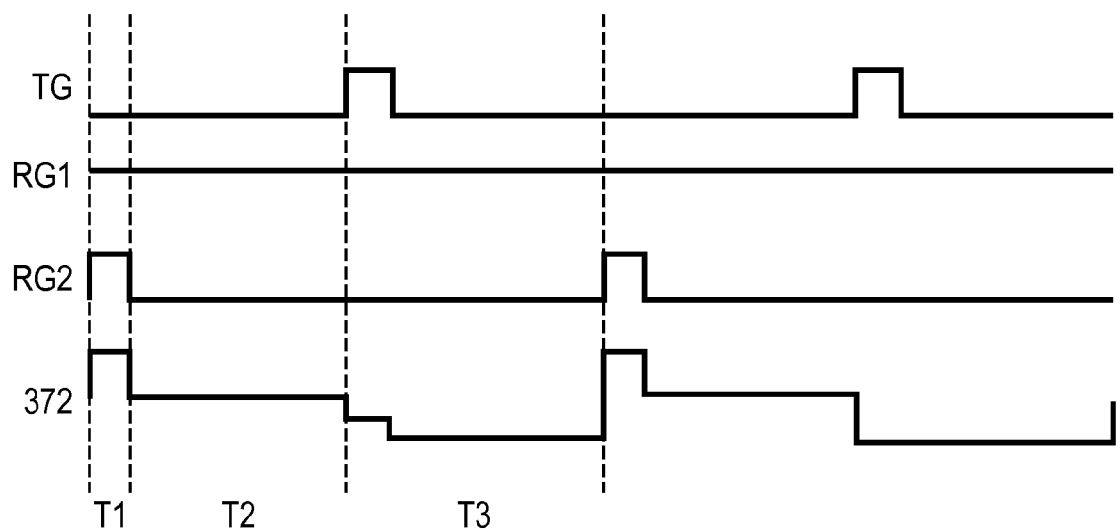

FIG. 8B depicts a timing diagram suitable to read out a charge packet at low gain in an embodiment in accordance with the invention. The gate RG1 of the first reset transistor 320 is held on for the entire time one charge packet is read out. At time T1, the gate RG2 of the second reset transistor 310 is pulsed on to reset the combined first and second sense nodes 315 and 325 to the power supply voltage 305. At time T2, a reset level ($V_{RL}$) of the low-gain amplification circuit 370 on output signal column line 372 is sampled. At time T3, the transfer transistor 335 is clocked to transfer one charge packet from the photodiode 301 onto the combined first and second sense nodes 315 and 325 and a signal level ($V_{SL}$) of the low-gain amplification circuit 370 on output signal column line 372 is sampled. The difference between the signal and reset levels ($V_{SL}$-$V_{RL}$) of the low-gain amplifier 370 is a low-gain measure of the charge packet.

The width-to-length ratios of the two amplification circuits 330, 370 are preferably designed to satisfy the relationship:

$$\frac{W1}{L1} < \frac{W2}{L2}.$$

The larger W2/L2 ratio adds capacitance to the second sense node 315 to reduce the gain. The larger W2/L2 ratio also reduces the noise of the transistor 370. In some embodiments in accordance with the invention, if only the capacitance of the sense node 315 is increased without changing the dimensions of amplification circuit 370, the noise of the low-gain output may be very high. One advantage of the second embodiment is the noise of the low-gain amplification circuit 370 is reduced without causing substantial harm to the noise performance of the high-gain amplification circuit 330. Additionally, the gate oxide thickness of transistor 330 may be made different from the gate oxide thickness of transistor 370 for further optimization of the noise performance in various embodiments in accordance with the invention.

Figure 9:
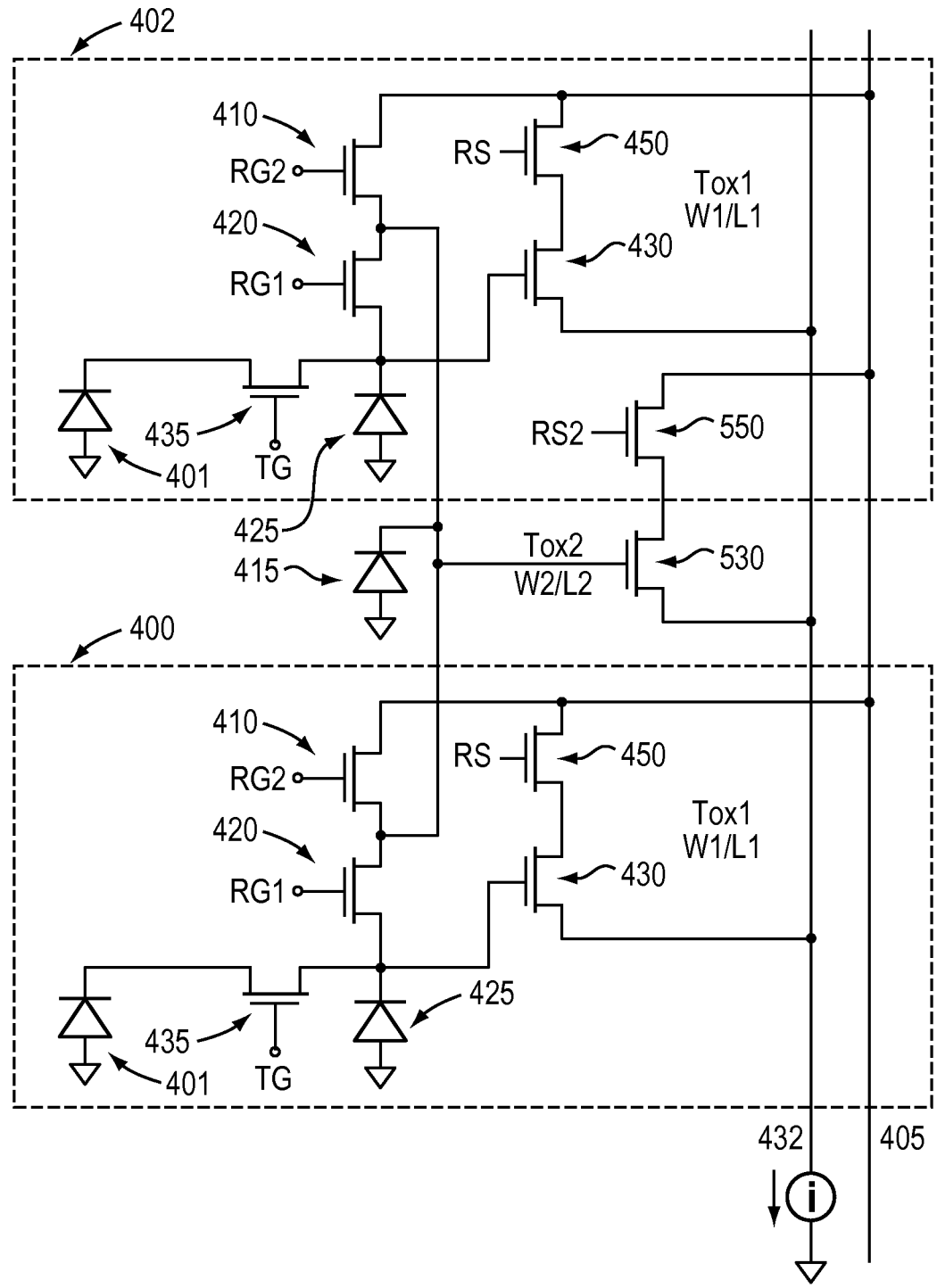
FIG. 9 is a schematic diagram of an output channel for a CMOS image sensor having a shared sense node for multiple pixels in accordance with various embodiments of the invention.

FIG. 9 illustrates a third embodiment of the present invention. The third embodiment is implemented in Complementary Metal Oxide Semiconductor (CMOS) image sensors. Two pixels 400 and 402 are shown. The pixels 400 and 402 are not necessarily adjacent in the pixel array. The pixels 400 and 402 each include a photodetector 401, a transfer gate 435, and a first sense node 425. Photodetector 401 collects charge carriers in response to incident light. Transfer gate 435 is used to transfer the charge carriers from photodetector 301 to first sense node 425.

In some embodiments in accordance with the invention, pixels 400, 402 are implemented in a shared-pixel configuration where multiple photodetectors share a transfer gate. The shared transfer gate connects each photodetector to a single sense node 425.

The first sense node 425 is connected to the gate of a first amplification circuit 430 having a gate width W1, gate length L1, and oxide thickness Tox1. The output of the first amplification circuit 430 is connected to an output signal column line 432. There is also an optional row select transistor 450 inserted between power supply 405 and the amplifying transistor 430 and the output signal column line 432. The row select transistor may also be located between the amplifying transistor 430 and the output signal column line 432.

The first reset transistor 430 is connected to the first sense node 425 and a second sense node 415. The second sense node 415 is shared among two or more pixels. A second reset transistor 410 is connected to the second sense node 415 and the power supply 405. FIG. 9 depicts a second reset transistor 410 in each pixel 400, 402. Various embodiments of the invention include only one second reset transistor in each group sharing a second sense node 415. However, one transistor 410 may be included in each pixel 400, 402 to maintain substantially identical physical circuit layouts for each pixel. If the transistor 410 is omitted from one of the shared pixels, then that pixel may have a different photo-response than those with transistor 410. The second sense node 415 is also connected to a second amplification circuit 530 having a gate width W2, gate length L2, and oxide thickness Tox2. The output of the second amplification circuit 530 is connected to an output signal column line 432. As shown, embodiments of the invention may include an optional second row select transistor 550 between the power supply 405 and the second amplification circuit 530. In the third embodiment shown in FIG. 9, all of the photodetectors 401 may be read out at high gain by only using the first sense node 425 or summed pixels may be read out at a lower gain by using shared sense node 415.

Figure 10A:
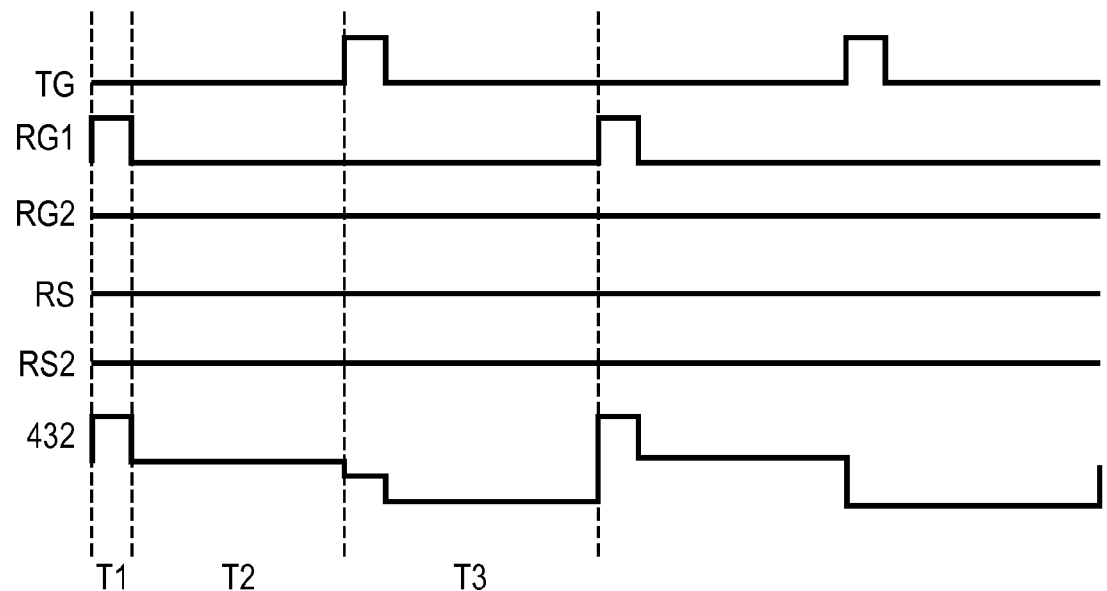
FIGS. 10A and 10B are timing diagrams for the operation of the output channel of FIG. 9 in accordance with various embodiments of the invention.

A timing diagram suitable to use for reading out every pixel at high gain in an embodiment in accordance with the invention is shown in FIG. 10A. The gate RS of the first row select transistor 450 is held on and the gate RS2 of the second row select transistor 550 is held off while reading out a charge packet. The gate RG2 of the second reset transistor 410 is held on while reading out a charge packet. At time T1, the gate RG1 of the first reset transistor 420 is pulsed on to reset the first sense node 425 to the power supply voltage 405. At time T2, a reset level ($V_{RH}$) of the high-gain amplifier output 432 is sampled. At time T3, the transfer transistor 435 is clocked to transfer one charge packet from the photodetector 401 onto the first sense node 425 and a signal level ($V_{SH}$) of the high-gain amplifier output 432 is sampled. The difference between the signal and reset levels ($V_{SH}$-$V_{RH}$) of the high-gain amplifier output 432 is a high-gain measure of the charge packet.

Figure 10B:
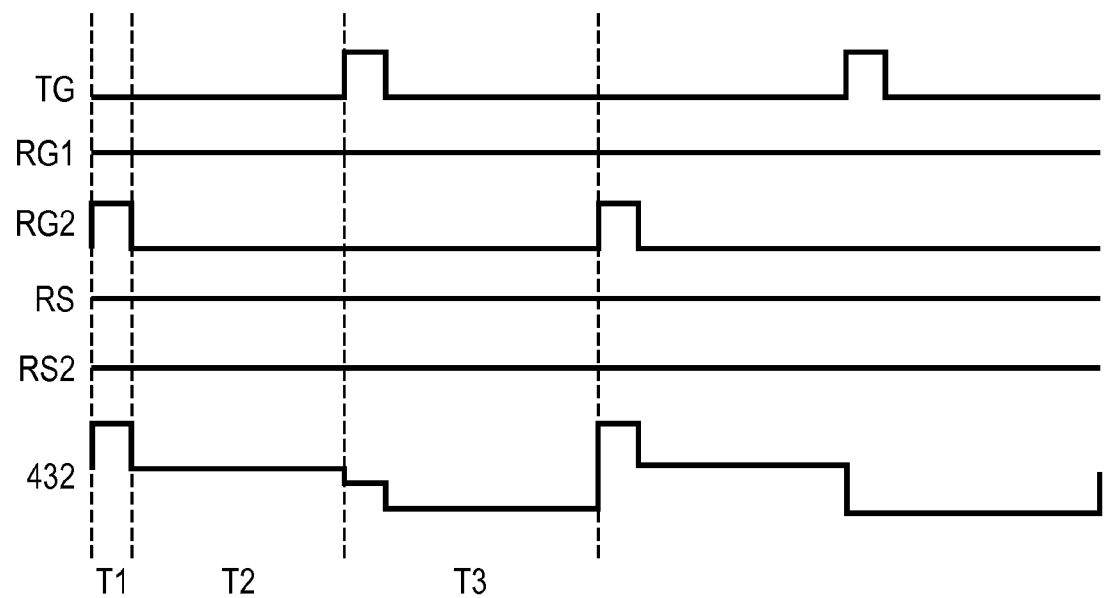

A timing diagram suitable to use for reading out the summed charge of multiple pixels 400 and 402 through a common low-gain amplifier 530 in an embodiment in accordance with the invention is shown in FIG. 10B. The gate RS of the first row select transistor 450 is held off and the gate RS2 of the second row select transistor 550 is held on while reading out a summed charge packet. The gate RG1 of the first reset transistor 420 is held on while reading out a charge packet. At time T1, the gate RG2 of the second reset transistor 410 is pulsed on to reset the combined first and second sense nodes 425 and 415 to the power supply voltage 405. At time T2, a reset level ($V_{RL}$) of the low-gain amplifier output 432 is sampled. At time T3, the transfer transistor 435 is clocked to transfer one charge packet from each of the multiple photodetectors 401 onto the combined first and second sense nodes 425 and 415 and a signal level ($V_{SL}$) of the low-gain amplifier output 432 is sampled. The difference between the signal and reset levels ($V_{SL}-V_{RL}$) of the low-gain amplifier output 432 is a low-gain measure of the summed packet.

In various embodiments of the invention, when summing together charge from multiple pixels, a low-gain amplifier is desired to prevent saturation, as multiple summed charge packets may saturate a high-gain amplifier. The low-gain amplifier gate width (W2), gate length (L2), and oxide thickness (Tox2) are selected for optimal noise performance with a large input capacitance on the combined sense nodes 415 and 425. The high-gain amplifier gate width (W1), gate length (L2), and oxide thickness (Tox1) are selected for optimal noise performance with a small input capacitance on the sense node 425 alone.

It should be noted that reversing the polarity of the timing signals and the polarity of the transistors (n-type to p-type, NMOS to PMOS) is used in some embodiments in accordance with the invention. Minor variations of the pixel schematic are also possible in embodiments in accordance with the invention. By way of example only, the pixel schematic may eliminate the transfer gate transistors, or the power supply may be pulsed to eliminate the row select transistors. Alternate summing patterns of pixels in FIG. 9 are possible such as, but not restricted to, summing across columns, not summing adjacent pixels, summing arbitrary numbers of pixels, summing pixels of the same colors, summing pixels of different colors, or summing some pixels but not others.

The sense nodes are implemented as floating diffusions and the amplification circuits as source follower transistors in an embodiment in accordance with the invention.

Figure 11:
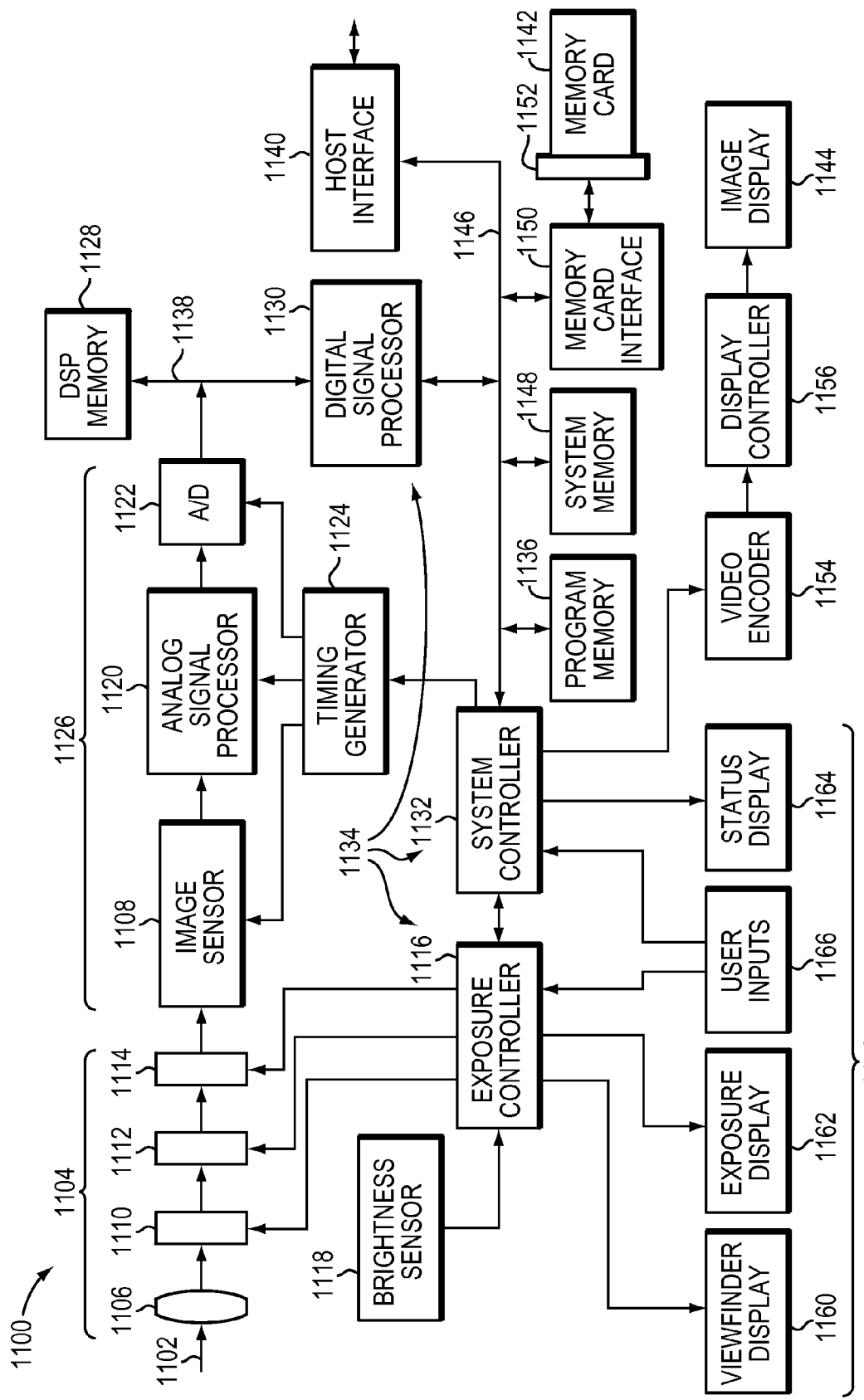
FIG. 11 is a block diagram of an image capture device incorporating an image sensor in accordance with various embodiments of the invention.

Embodiments of the present invention may be utilized in a variety of different systems and devices, including, for example, digital cameras, digital video cameras, scanners, and telescopes. FIG. 11 illustrates an exemplary image capture device 1100 in accordance with an embodiment of the invention. Image capture device 1100 is implemented as a digital camera in FIG. 11.

Light 1102 from a subject scene to be imaged is input to an imaging stage 1104, where the light is focused by a lens 1106 to form an image on a CCD image sensor 1108 (which may features depicted in FIGS. 2, 5, 6, and/or 9). Image sensor 1108 converts the incident light to an electrical signal for each pixel thereof. The pixels of image sensor 1108 may have a color filter array (not shown) applied thereover so that each pixel senses a portion of the imaging spectrum, as is known in the art.

The light passes through the lens 1106 and a filter 1110 prior to being sensed by image sensor 1108. Optionally, light 1102 passes through a controllable iris 1112 and a mechanical shutter 1114. The filter 1110 may include or consist essentially of an optional neutral-density filter for imaging brightly lit scenes. An exposure controller 1116 responds to the amount of light available in the scene, as metered by a brightness sensor block 1118, and regulates the operation of filter 1110, iris 1112, shutter 1114, and the integration time (or exposure time) of image sensor 608 to control the brightness of the image as sensed by image sensor 1108.

This description of a particular camera configuration will be familiar to those skilled in the art, and it will be obvious that many variations and additional features are, or may be, present. For example, an autofocus system may be added, or the lenses may be detachable and interchangeable. It will be understood that embodiments of the present invention may be applied to any type of digital camera, where similar functionality is provided by alternative components. For example, the digital camera may be a relatively simple point-and-shoot digital camera, where shutter 1114 is a relatively simple movable blade shutter, or the like, instead of a more complicated focal plane arrangement as may be found in a digital single-lens reflex camera. Embodiments of the invention may also be incorporated within imaging components included in simple camera devices such as those found in, e.g., mobile phones and automotive vehicles, which may be operated without controllable irises 1112 and/or mechanical shutters 1114. Lens 1106 may be a fixed focal-length lens or a zoom lens.

As shown, the analog signal from image sensor 1108 (corresponding to the amount of charge collected from one or more pixels) is processed by analog signal processor 1120 and applied to one or more analog-to-digital (A/D) converters 1122. A timing generator 1124 produces various clocking signals to select rows, columns, or pixels in image sensor 1108, to transfer charge out of image sensor 1108, and to synchronize the operations of analog signal processor 1120 and A/D converter 1122. An image sensor stage 1126 may include image sensor 1108, analog signal processor 1120, A/D converter 1122, and timing generator 1124. The resulting stream of digital pixel values from A/D converter 1122 is stored in a memory 1128 associated with a digital signal processor (DSP) 1130.

DSP 1130 is one of three processors or controllers in the illustrated embodiment, which also includes a system controller 1132 and exposure controller 1116. Although this partitioning of camera functional control among multiple controllers and processors is typical, these controllers or processors are combined in various ways without affecting the functional operation of the camera and the application of embodiments of the present invention. These controllers or processors may include or consist essentially of one or more DSP devices, microcontrollers, programmable logic devices, or other digital logic circuits. Although a combination of such controllers or processors has been described, it should be apparent that one controller or processor may be designated to perform all of the required functions. All of these variations may perform the same function and fall within the scope of various embodiments of the invention, and the term "processing stage" is utilized herein to encompass all of this functionality within one phrase, for example, as in processing stage 1134 in FIG. 11.

In the illustrated embodiment, DSP 1130 manipulates the digital image data in memory 1128 according to a software program stored in a program memory 1136 and copied to memory 1128 for execution during image capture. DSP 1130 executes the software necessary for image processing in an embodiment of the invention. Memory 1128 may include or consist essentially of any type of random access memory, such as SDRAM. A bus 1138, a pathway for address and data signals, connects DSP 1130 to its related memory 1128, A/D converter 1122, and other related devices.

System controller 1132 controls the overall operation of the image capture device 1100 based on a software program stored in program memory 1136, which may include or consist essentially of, e.g., flash EEPROM or other nonvolatile memory. This memory may also be used to store image sensor calibration data, user setting selections, and/or other data to be preserved when the image capture device 1100 is powered down. System controller 1132 controls the sequence of image capture by directing exposure controller 1116 to operate lens 1106, filter 1110, iris 1112, and shutter 1114 as previously described, directing timing generator 1124 to operate image sensor 1108 and associated elements, and directing DSP 1130 to process the captured image data. After an image is captured and processed, the final image file stored in memory 1128 may be transferred to a host computer via an interface 1140, stored on a removable memory card 1142 or other storage device, and/or displayed for the user on an image display 1144.

A bus 1146 includes a pathway for address, data and control signals, and connects system controller 1132 to DSP 1130, program memory 1136, a system memory 1148, host interface 1140, memory card interface 1150, and/or other related devices. Host interface 1140 provides a high-speed connection to a personal computer or other host computer for transfer of image data for display, storage, manipulation, and/or printing. This interface may include or consist essentially of an IEEE 1394 or USB 2.0 serial interface or any other suitable digital interface. Memory card 1142 is typically a Compact Flash card inserted into a socket 1152 and connected to system controller 1132 via memory card interface 1150. Other types of storage that may be utilized include, without limitation, PC-Cards, MultiMedia Cards, and/or Secure Digital cards.

Processed images may be copied to a display buffer in system memory 1148 and continuously read out via a video encoder 1154 to produce a video signal. This signal may be output directly from image capture device 1100 for display on an external monitor, or processed by a display controller 1156 and presented on image display 1144. This display is typically an active-matrix color liquid crystal display, although other types of displays may be utilized.

A user interface 1158, including all or any combination of a viewfinder display 1160, an exposure display 1162, a status display 1164, image display 1144, and user inputs 1166, may be controlled by one or more software programs executed on exposure controller 1116 and system controller 1132. User inputs 1166 typically include some combination of buttons, rocker switches, joysticks, rotary dials, and/or touch screens. Exposure controller 1116 operates light metering, exposure mode, autofocus and other exposure functions. System controller 1132 manages the graphical user interface (GUI) presented on one or more of the displays, e.g., on image display 1144. The GUI typically includes menus for making various option selections and review modes for examining captured images.

Exposure controller 1116 may accept user inputs selecting exposure mode, lens aperture, exposure time (shutter speed), and exposure index or ISO speed rating and directs the lens and shutter accordingly for subsequent captures. Optional brightness sensor 1118 may be employed to measure the brightness of the scene and provide an exposure meter function for the user to refer to when manually setting the ISO speed rating, aperture, and shutter speed. In this case, as the user changes one or more settings, the light meter indicator presented on viewfinder display 1160 tells the user to what degree the image will be over- or under-exposed. In an alternate case, brightness information is obtained from images captured in a preview stream for display on image display 1144. In an automatic exposure mode, the user changes one setting and exposure controller 1116 automatically alters another setting to maintain correct exposure, e.g., for a given ISO speed rating when the user reduces the lens aperture, exposure controller 1116 automatically increases the exposure time to maintain the same overall exposure.

The foregoing description of an image capture device will be familiar to one skilled in the art. It will be obvious that there are many variations that are possible and may be selected to reduce the cost, add features, or improve the performance thereof.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An image sensor comprising:
  an array of photo-sensitive regions (PSRs) for accumulating photo charge in response to incident light; and
  associated with at least one of the PSRs, an output channel comprising:
    a sense node for converting photocharge into voltage,
    a capacitance control unit connected to the sense node, wherein the capacitance control unit comprises a first reset transistor coupled between a first voltage and a second sense node, and a second reset transistor having a current conduction path coupled between the second sense node and the sense node,
    connected to the sense node, a first amplification circuit coupled to a first output signal line and having a first transconductance, and
    connected to the second sense node, a second amplification circuit coupled to a second output signal line and having a second transconductance larger than the first transconductance.

2. The image sensor of claim 1, wherein the second amplification circuit is connected to the second sense node.

3. The image sensor of claim 1, wherein (i) the first amplification circuit comprises a first transistor having a first gate length, a first gate width, and a first gate oxide thickness, and (ii) the second amplification circuit comprises a second transistor having a second gate length, a second gate width, and a second gate oxide thickness.

4. The image sensor of claim 1, wherein each PSR is a portion of a CCD image sensor pixel, and the output channel is associated with a plurality of columns of CCD image sensor pixels.

5. The image sensor of claim 1, wherein each PSR is a portion of a CMOS image sensor pixel, and a different output channel is associated with each CMOS image sensor pixel.

6. The image sensor of claim 3, wherein the first and second gate oxide thicknesses are different.

7. The image sensor of claim 3, wherein a ratio of the first gate width to the first gate length is selected based on the capacitance of the sense node.

8. The image sensor of claim 3, wherein a ratio of the second gate width to the second gate length is selected based on the combined capacitance of the sense node and the second sense node.

9. The image sensor of claim 3, wherein a ratio of the first gate width to the first gate length is smaller than a ratio of the second gate width to the second gate length.

10. An image sensor comprising:
- an array of photo-sensitive regions (PSRs) for accumulating photo charge in response to incident light;
- associated with at least one of the PSRs, (i) a first sense node for converting photo charge into voltage, (ii) a first capacitance control unit connected to the first sense node, and (iii) connected to the first sense node, a first amplification circuit having a first transconductance;
- associated with at least one other of the PSRs, (i) a second sense node for converting photo charge into voltage, (ii) a second capacitance control unit connected to the second sense node, and (iii) connected to the second sense node, a second amplification circuit having a second transconductance; and
- connected to the first and second capacitance control units, a third amplification circuit having a third transconductance larger than at least one of the first or second transconductances.

11. The image sensor of claim 10, wherein the first and second transconductances are approximately equal.

12. The image sensor of claim 10, wherein the third transconductance is larger than both the first and second transconductances.

13. The image sensor of claim 10, wherein (i) the first amplification circuit comprises a first transistor having a first gate length, a first gate width, and a first gate oxide thickness, (ii) the second amplification circuit comprises a second transistor having a second gate length, a second gate width, and a second gate oxide thickness, and (iii) the third amplification circuit comprises a third transistor having a third gate length, a third gate width, and a third gate oxide thickness.

14. The image sensor of claim 13, wherein (i) the first gate length is approximately equal to the second gate length, (ii) the first gate width is approximately equal to the second gate width, and (iii) the first gate oxide thickness is approximately equal to the second gate oxide thickness.

15. The image sensor of claim 14, wherein a ratio of the first gate width to the first gate length is smaller than a ratio of the third gate width to the third gate length.

16. An image sensor comprising:
- a first pixel comprising (i) a first photosensitive region for accumulating photo charge in response to incident light, (ii) a first sense node for converting photo charge into voltage, (iii) a first capacitance control unit connected to the first sense node, and (iv) connected to the first sense node, a first amplification circuit having a first transconductance;
- a second pixel comprising (i) a second photosensitive region for accumulating photo charge in response to incident light, (ii) a second sense node for converting photo charge into voltage, (iii) a second capacitance control unit connected to the second sense node, and (iv) connected to the second sense node, a second amplification circuit having a second transconductance; and
- connected to the first and second capacitance control units, a third amplification circuit having a third transconductance larger than at least one of the first or second transconductances.

17. A method of measuring accumulated charge at low gain and high gain in an image sensor having an array of photo-sensitive regions (PSRs) and, associated with at least one PSR, an output channel comprising (i) a sense node, (ii) a first amplification circuit having a first transconductance, and (iii) a second amplification circuit having a second transconductance larger than the first transconductance, the method comprising:
- accumulating charge within at least one PSR in response to incident light;
- before transferring the accumulated charge to the sense node, (i) sampling a high-gain reset level with the first amplification circuit and (ii) sampling a low-gain reset level with the second amplification circuit;
- transferring the accumulated charge to the sense node to convert the charge into a voltage;
- after transferring the accumulated charge to the sense node, (i) sampling a high-gain signal level corresponding to the accumulated charge with the first amplification circuit and (ii) sampling a low-gain signal level corresponding to the accumulated charge with the second amplification circuit,
- wherein (i) the low-gain measure of the accumulated charge is a difference between the low-gain signal level and the low-gain reset level, and (ii) the high-gain measure of the accumulated charge is a difference between the high-gain signal level and the high-gain reset level.

18. A method of measuring accumulated charge at least at one of low gain or high gain in an image sensor comprising an array of photo-sensitive regions (PSRs) for accumulating photo charge in response to incident light and associated with at least one of the PSRs, an output channel comprising (i) a sense node for converting photo charge into voltage, (ii) a capacitance control unit connected to the sense node, (iii) connected to the sense node, a first amplification circuit having a first transconductance, and (iv) connected to the capacitance control unit, a second amplification circuit having a second transconductance larger than the first transconductance, the method comprising:
- at least one of:
  - (i) sampling a high-gain reset level with the first amplification circuit before transferring accumulated charge to the sense node and (ii) sampling a high-gain signal level with the first amplification circuit after transferring accumulated charge to the sense node, the high-gain measure of the accumulated charge being a difference between the high-gain signal level and the high-gain reset level, or
  - (i) sampling a low-gain reset level with the second amplification circuit before transferring accumulated charge to the sense node and (ii) sampling a low-gain signal level with the second amplification circuit after transferring accumulated charge to the sense node, the low-gain measure of the accumulated charge being a difference between the low-gain signal level and the low-gain reset level.

\* \* \* \* \*